United States Patent
Jeong

(10) Patent No.: US 9,810,274 B2
(45) Date of Patent: Nov. 7, 2017

(54) SECONDARY BRAKE FOR COMMERCIAL VEHICLE USING MR FLUID

(71) Applicant: Hyundai Motor Company, Seoul (KR)

(72) Inventor: Jong Yun Jeong, Bongdong-eup (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/933,865

(22) Filed: Nov. 5, 2015

(65) Prior Publication Data

US 2016/0290421 A1    Oct. 6, 2016

(30) Foreign Application Priority Data

Mar. 31, 2015  (KR) .......................... 10-2015-0044929

(51) Int. Cl.
   *F16D 57/00*   (2006.01)
   *B60T 10/02*   (2006.01)

(52) U.S. Cl.
   CPC ............ *F16D 57/002* (2013.01); *B60T 10/02* (2013.01)

(58) Field of Classification Search
   CPC ...... F16D 57/002; F16F 9/535; H02K 7/1021; H02K 7/1023; H02K 7/1025
   See application file for complete search history.

(56) References Cited

U.S. PATENT DOCUMENTS

| | | | | |
|---|---|---|---|---|
| 5,967,273 A  * | 10/1999 | Hampton | ............... | F16D 37/008 192/21.5 |
| 6,290,033 B1 * | 9/2001 | Oliver | ..................... | F16D 37/02 188/267.1 |
| 6,681,905 B2 * | 1/2004 | Edmondson | ......... | B60G 13/001 188/130 |
| 6,916,074 B2 * | 7/2005 | Jung | ....................... | B60T 7/042 188/267.2 |
| 7,275,750 B2 * | 10/2007 | Suchta | ............... | B60G 21/0556 188/267.2 |
| 2005/0087408 A1 * | 4/2005 | Namuduri | ............... | F16F 9/535 188/267.1 |
| 2009/0266670 A1 | 10/2009 | McDaniel | | |
| 2010/0231069 A1 * | 9/2010 | Liao | ..................... | H02K 7/1025 310/77 |

FOREIGN PATENT DOCUMENTS

| | | |
|---|---|---|
| EP | 1 081 405 A2 | 7/2001 |
| JP | 2583624 Y2 | 10/1998 |
| JP | 2013-170636 A | 9/2013 |
| JP | 2013-190030 A | 9/2013 |
| KR | 2002-0072450 A | 9/2002 |
| KR | 10-2005-0052520 A | 6/2005 |
| KR | 10-2009-0124687 A | 12/2009 |
| KR | 10-2011-0089859 A | 8/2011 |

* cited by examiner

*Primary Examiner* — Vishal Sahni
(74) *Attorney, Agent, or Firm* — Morgan Lewis & Bockius LLP

(57) ABSTRACT

A secondary brake for commercial vehicles using Magnetorheological (MR) fluid may include a rotor coupled to a transmission output shaft to be rotated together, a stator configured to be disposed between the rotor and a body of a transmission and having a cavity into which the MR fluid is filled and a portion of the rotor is received, and a stator coil provided in a portion of the stator and applying a magnetic field to the MR fluid so that braking torque is generated due to a shear resistance characteristic of the MR fluid.

4 Claims, 3 Drawing Sheets

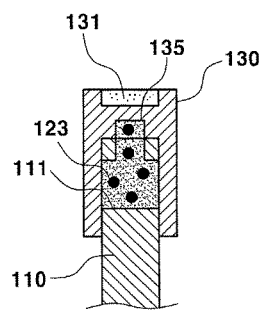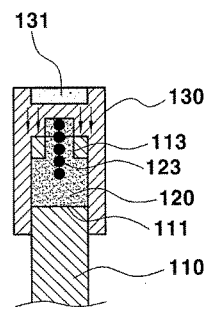
[ BEFORE MAGNETIC FIELD IS APPLIED ]   [ AFTER MAGNETIC FIELD IS APPLIED ]
FIG. 3A                FIG. 3B
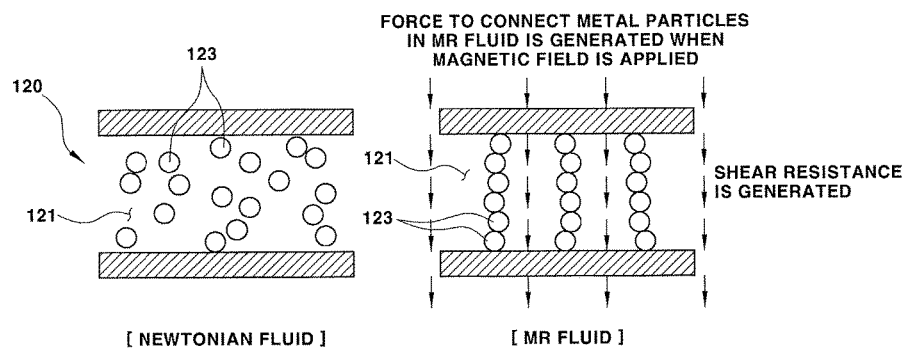
FIG. 4

SECONDARY BRAKE FOR COMMERCIAL VEHICLE USING MR FLUID

CROSS-REFERENCE TO RELATED APPLICATION

The present application claims priority to Korean Patent Application No. 10-2015-0044929 filed Mar. 31, 2015, the entire contents of which is incorporated herein for all purposes by this reference.

BACKGROUND OF THE INVENTION

Field of the Invention

The present invention relates to a secondary brake for commercial vehicles. More particularly, the present invention relates to a secondary brake for commercial vehicles using magnetorheological (MR) fluid that has high braking output per unit volume or unit weight because large braking power can be provided using a small amount of fluid, is possible to be manufactured in a reliable and simple structure, and improves marketability of the commercial vehicle.

Description of Related Art

Generally, since commercial vehicles are very heavy in weight, a fade phenomenon (a phenomenon in that braking power is decreased by deteriorated contact between a drum and a lining due to burning and deformation of the brake drum of a vehicle by frictional heat) caused by overheating generated when a primary brake (a wheel brake) is excessively used may lead to an accident of the commercial vehicle.

Accordingly, secondary brakes are necessarily applied in most of the commercial vehicles. The secondary brakes are divided into an exhaust brake, an engine brake, and a fluid-type retarder brake, etc., according to a control method.

Among them, the fluid-type retarder brake is widely used for heavy-duty trucks because it has the greatest brake torque. The fluid-type retarder brake exhibits 15% performance of a brake torque of a common primary brake, and braking ability that usually can brake the trucks on a road having about 9% gradient without braking the primary brake.

However, while the primary brakes exhibit a response characteristic of 0.5 second or less, the fluid-type retarder secondary brakes exhibit a response characteristic about 0.9~1.5 seconds, so that the fluid-type retarder secondary brakes have a much slower response speed than the primary brakes.

That is, as illustrated in FIG. 1, since a transmission output shaft 10 and a rotor 20 are integrally rotated while the fluid-type retarder brake is not operated, a rotational resistance due to viscosity resistance of the fluid is generated when operating fluid is present in a space between the rotor 20 and a stator 30.

Accordingly, in order to prevent rotational resistance, the operating fluid is stored in a separate reservoir and fills up the operating space by means of an oil pump 40 when the retarder brake is operated, thereby response time for operating of 0.9~1.5 seconds is required, thus the retarder brake has difficulty in being used during an emergency and has a tendency of being braked easily only in a situation in which slow braking is required.

Although the braking torque is output by adjusting fluid density as describe above, since viscosity characteristic of the fluid is constant, in order to adjust a magnitude of the braking torque output, the density of the operating fluid filled into the space between the rotor 20 and the stator 30 (an amount of fluid being filled into the space) should be controlled as required.

Accordingly, braking is operated with a somewhat slow and sluggish feel in a braking situation requiring a quick response or in an interlocking operation with the primary brake.

Meanwhile, the fluid-type retarder brake has a very large outer size and a heavy weight compared to an output performance and is expensive considering the output performance, due to the components including the rotor 20, the stator 30, an operating fluid reservoir 50, and the oil pump 40, etc., so that there is a problem of the vehicle purchase price being increased.

Meanwhile, since the application of the secondary brake is compulsory depending on laws by each country for a reason of commercial vehicle safety, it is required in future that competitive power of a product at a relatively low price comparable to the output performance is secured.

An electronic brake system is actively applied recently by digitalization of the primary brake control, and active control of the primary and secondary brakes is attempted in various situations.

However, since the fluid-type retarder brake has a disadvantage in that feeling of control cannot be easily improved compared to the braking performance because of a slow control response due to the fluid characteristic, there is an insufficient feel of braking in an electronically controlled interlocking operation with the primary brake.

As a result, although the fluid-type retarder brake has the highest braking performance as the secondary brake, it has a disadvantage in that it is bulky and weight is increased because it uses fluid.

Accordingly, a retarder type secondary brake that exhibits large braking torque with small volume and a quick control characteristic is required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a secondary brake for commercial vehicles using magnetorheological (MR) fluid, in which since the MR fluid which varies in viscosity of shear resistance by a magnetic field is applied in the secondary brake, the secondary brake has a high output ratio per unit volume/weight because large braking power can be provided by a small amount of fluid, is possible to be manufactured in a reliable and simple structure, and improves marketability of the commercial vehicles by developing the secondary brake.

According to various aspects of the present invention, a secondary brake for commercial vehicles using Magnetorheological (MR) fluid may include a rotor coupled to a transmission output shaft to be rotated together, a stator configured to be disposed between the rotor and a body of a transmission and having a cavity into which the MR fluid is filled and a portion of the rotor is received, and a stator coil provided in a portion of the stator and applying a magnetic field to the MR fluid so that braking torque is generated due to a shear resistance characteristic of the MR fluid.

The secondary brake may further include a circumferential hole formed in the cavity of the stator in a circumferential direction to receive the MR fluid, through holes formed in the portion of the rotor received in the cavity to receive the MR fluid, and flow holes formed in the portion of the rotor received in the cavity to provide a passage allowing the MR fluid in the through holes to flow into the circumferential hole.

A plurality of the through holes and a plurality of the flow holes are sequentially formed at regular intervals along a circumferential direction of the rotor.

The secondary brake may further include a coil controller which is connected to the stator coil and configured to control magnetic force of the stator coil by increasing electric power in steps, and a fluid supply which is interlocked with the coil controller and supplies MR fluid to the cavity.

The fluid supply may be provided with a solenoid valve which is opened and closed in steps by a plurality of actuating switches provided in the coil controller, and a fluid cylinder configured to supply the MR fluid to the cavity, in which the fluid cylinder may be actuated in a piston manner by receiving compressed air through the opening and closing of the solenoid valve.

By providing the present invention constructed like above, the secondary brake has a high output ratio per unit volume/weight because large braking power can be provided with a small amount of fluid, is possible to be manufactured in a reliable and simple structure, and improves a marketability of the commercial vehicles by developing the secondary brake.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3A and FIG. 3B are views illustrating an operating state of the exemplary secondary brake for the commercial vehicles using the MR fluid according to the present invention.

FIG. 4 is an exemplary view illustrating a characteristic of MR fluid applied to the exemplary secondary brake for the commercial vehicles using the MR fluid according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
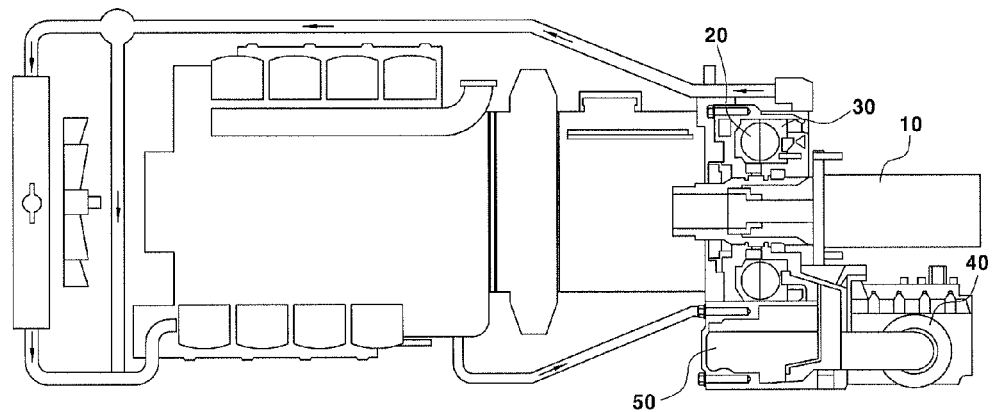
FIG. 1 is a view illustrating a common secondary brake for commercial vehicles.
Figure 2:
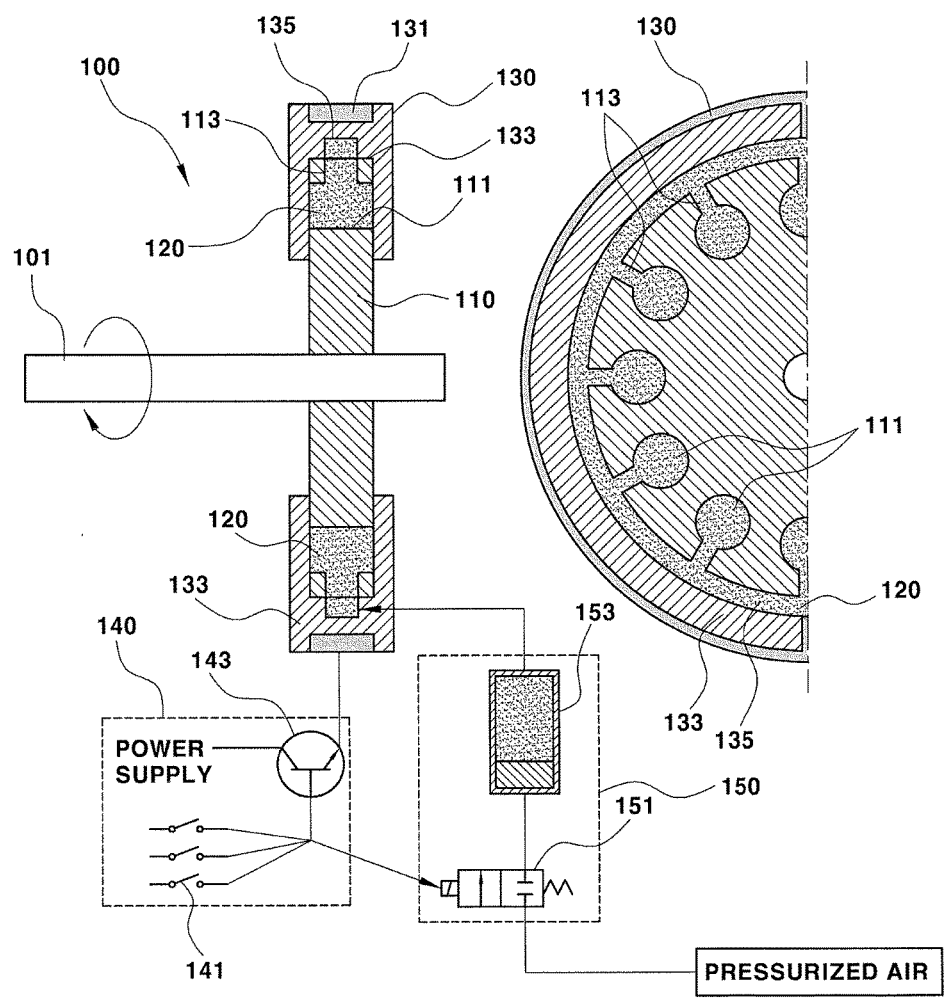
FIG. 2 is a view illustrating an exemplary secondary brake for commercial vehicles using magnetorheological (MR) fluid according to the present invention.

A secondary brake 100 for commercial vehicles using Magnetorheological (MR) fluid according to the present invention includes a rotor 110 which is coupled to a transmission output shaft 101 to be integrally rotated, the transmission output shaft 101 being coupled to a transmission to transmit driving force, as illustrated in FIG. 2, and a stator 130 disposed between the rotor 110 and a body of the transmission, in which the stator 130 has a cavity 133 into which MR fluid 120 is filled and a portion of the rotor 110 is received.

Here, a stator coil 131 is further provided (in a portion of the stator 130, in which the stator coil 131 applies magnetic field to the MR fluid 120 so that a braking torque is generated by a shear resistance characteristic of the MR fluid 120.

Accordingly, when braking is required while the vehicle is driven by a driving force transmitted via the transmission output shaft 101, a primary brake and the secondary brake 100 brake the commercial vehicle together.

A circumferential hole 135 in which the MR fluid 120 flows in circumferential direction is formed in the cavity 133 of the stator 130 corresponding to the circumferential surface of the rotor 110, and a plurality of through holes 111 is formed in the rotor 110 at intervals in the circumferential direction.

Due to this, when the rotor 110 rotates in the cavity 133 filled with the MR fluid 120, the braking torque may be maximized by generating maximum shear resistance due to the magnetic field from the stator coil 131.

That is, since the shear resistance characteristic of the MR fluid 120 generated by the magnetic field, and Newtonian fluid property which has an inherent viscosity resistance generated by the circumferential hole 135 and the through holes 111 formed in the cavity 133 and the rotor 110, respectively, are applied together, braking output may be maximized.

It is preferred that flow holes 113 in which the MR fluid 120 flows are further formed in the rotor 110, each of the flow holes 113 extending from the through holes 111 to the circumferential hole 135 in a radial direction.

That is, the MR fluid 120 circulates via the through holes 111, the flow holes 113, and the circumferential hole 135, makes a response speed faster with the shear resistance by the magnetic field, and provides full braking power by the viscosity resistance.

Meanwhile, the secondary brake 100 further includes a coil controller 140 which is connected to the stator coil 131, and increases electric power in steps, thereby controlling magnetic force of the stator coil 131.

The secondary brake 100 may further include a fluid supply 150 which is interlocked with the coil controller 140 and supplies the MR fluid 120 to the cavity 133.

At this time, the fluid supply 150 includes, as illustrated in FIG. 2, a solenoid valve 151 which is opened and closed in steps by a plurality of actuating switches 141 provided in the coil controller 140.

The secondary brake 100 includes a fluid cylinder 153 for supplying the MR fluid 120 to the cavity 133, in which the fluid cylinder 153 is actuated in a piston manner by receiving compressed air through opening and closing of the solenoid valve 151.

This adjusts the magnitude of the shear resistance of the MR fluid 120 according to the magnetic field, by adjusting an amount of electric power supplied to a transistor 143 and forming intensities of the magnetic field in a stepwise manner, depending on pushed angles of a brake pedal manipulated by a driver or the number of operations of the actuating switches 141, when the braking of the commercial vehicle is required.

Open and closed areas of the solenoid valve 151 are adjusted in stepwise manner also while being interlocked with the manipulation of the actuating switch 141, and compressive force of the compressed air supplied through the solenoid valve 151 is adjusted, thereby adjusting an amount of MR fluid 120 supplied from the fluid cylinder 153 so as to optimize the braking power.

Meanwhile, referring to FIG. 4, Magnetorheological (MR) fluid has an MR effect in which a resistance of fluid flow is increased when the magnetic field is applied and exhibits a similar phenomenon with a Winslow's Electrorheological (ER) effect. The MR fluid is a fluid in which paramagnetic particles are dispersed in a low permeability solvent. The MR fluid exhibits a behavior like a Newtonian fluid in which the particles move free when no magnetic field is applied, but exhibits a Bingham fluid behavior in which the particles are charged to form chain structures and thus provide yield stress when the magnetic field is applied.

That is, the MR fluid 120 is a non-colloidal solution in which magnetic particles in micron (μm) sizes are dispersed in a nonconductive solvent, such as silicon oil or mineral oil.

Accordingly, as illustrated in FIGS. 3A, 3B, and 4, the magnetic particles are dispersed, thereby exhibiting a Newtonian fluid property, when no magnetic field is applied to the MR fluid 120, but the dispersed magnetic particles are polarized and chained like fiber in the same direction as the applied magnetic field, thereby generating shear resistance against the motion of the rotor 110 when the magnetic field is applied by the stator coil 131.

Accordingly, the MR fluid 120 generates viscous braking power against the rotation of the transmission output shaft 101, and also brakes the transmission output shaft 101 by using only the shear resistance characteristic of the MR fluid which has the same viscosity as the existing Newtonian fluid, thereby braking output is varied depending on the magnetic field applied.

By providing the present invention constructed like above, the secondary brake has a high output ratio per unit volume/weight because large braking power can be provided using a small amount of fluid, is possible to be manufactured in a reliable and simple structure, and improves marketability of the commercial vehicles by developing the competitive secondary brake.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A secondary brake for commercial vehicles using Magnetorheological (MR) fluid comprising:
   a rotor coupled to a transmission output shaft to be rotated together;
   a stator configured to be disposed between the rotor and a body of a transmission and having a cavity formed in the stator, wherein a portion of the rotor is received in the cavity;
   a stator coil provided in a portion of the stator and applying a magnetic field to the MR fluid so that braking torque is generated due to a shear resistance characteristic of the MR fluid;
   a circumferential hole formed in the cavity of the stator in a circumferential direction to receive the MR fluid inside of the circumferential hole;
   through holes formed in the portion of the rotor to receive the MR fluid inside the through holes; and
   flow holes formed in the portion of the rotor received in the cavity to provide a passage allowing the MR fluid in the through holes to flow into the circumferential hole,
   wherein the MR fluid circulates via the through holes of the rotor, the flow holes of the rotor, and the circumferential hole of the stator.

2. The secondary brake of claim 1, wherein a plurality of the through holes and a plurality of the flow holes are sequentially formed at regular intervals along a circumferential direction of the rotor.

3. A secondary brake for commercial vehicles using Magnetorheological (MR) fluid comprising:
   a rotor coupled to a transmission output shaft to be rotated together;
   a stator configured to be disposed between the rotor and a body of a transmission and having a cavity formed in the stator, wherein the MR fluid is filled in the cavity and a portion of the rotor is received in the cavity;
   a stator coil provided in a portion of the stator and applying a magnetic field to the MR fluid so that braking torque is generated due to a shear resistance characteristic of the MR fluid;
   a coil controller connected to the stator coil and configured to control magnetic force of the stator coil by increasing electric power in steps; and
   a fluid supply which is interlocked with the coil controller and supplies MR fluid to the cavity,
   wherein the rotor formed in the cavity of the stator having through holes and flow holes,
   wherein a magnitude of the shear resistance of the MR fluid is configured to be adjusted by regulating amount of the MR fluid depending on pushed angles of a brake pedal manipulated by a driver or a number of operations of actuating switches, and wherein the MR fluid circulates via the through holes of the rotor, the flow holes of the rotor, and the circumferential hole of the stator.

4. The secondary brake of claim 3, wherein the fluid supply is provided with a solenoid valve which is opened and closed in steps by a plurality of actuating switches provided in the coil controller, and a fluid cylinder configured to supply the MR fluid to the cavity, wherein the fluid cylinder is actuated by receiving compressed air through the opening and closing of the solenoid valve.

* * * * *